United States Patent [19]

Bowers et al.

[11] Patent Number: 4,880,580
[45] Date of Patent: Nov. 14, 1989

[54] REUSABLE PLASTIC DRUM CONTAINER ASSEMBLY AND PROCESS FOR REFITTING SUCH PLASTIC DRUM CONTAINER ASSEMBLY

[75] Inventors: Robert B. Bowers, Park Ridge; Mark Chookazian, Paramus, both of N.J.

[73] Assignee: Ashland Oil, Inc., Russell, Ky.

[21] Appl. No.: 128,030

[22] Filed: Dec. 3, 1987

[51] Int. Cl.$^4$ ............................................. B29C 35/12
[52] U.S. Cl. ....................................... 264/26; 156/69; 156/98; 156/272.4; 264/36; 264/262
[58] Field of Search ...................... 264/25, 26, 27, 36, 264/262; 156/69, 98, 272.4

[56] References Cited

U.S. PATENT DOCUMENTS 3,620,875 11/1971 Guglielmo ...................... 156/275.3
3,808,073 4/1974 Navarre ............................. 156/69
3,940,845 3/1976 Czerwiak ........................ 156/272.4
4,201,306 5/1980 Dubois et al. ...................... 156/69

Primary Examiner—Jeffery Thurlow
Attorney, Agent, or Firm—Louis E. Marn

[57] ABSTRACT

A novel reusable plastic drum container assembly and a process for installing a fitting-receiving member in an opening provided in a drum head wherein the opening is formed by a cylindrically-shaped neck member having an outer sloping surface including a circularly-shaped indentation portion extending perpendicularly from top surface of the drum head and wherein the fitting-receiving member in cross-section is of an inverted U-shape having an inner cylindrically-shaped portion, a circularly-shaped base portion, and an outer cylindrically-shaped leg portion defining a channel and is disposed over the neck member of the drum head with an electromagnetic bonding material fused between the outer surfaces of the neck member and the interior surfaces of the fitting-receiving member.

14 Claims, 2 Drawing Sheets

REUSABLE PLASTIC DRUM CONTAINER ASSEMBLY AND PROCESS FOR REFITTING SUCH PLASTIC DRUM CONTAINER ASSEMBLY

FIELD OF THE INVENTION

This invention relates to a reusable plastic drum container assembly, and more particularly to a reusable plastic drum container assembly and process for installing and removing fittings in a drum head of such a plastic drum container assembly.

DESCRIPTION OF THE PRIOR ART

Steel drums have a useful life extended by from 3-4 times by diverse reconditioning protocols. Generally, steel drums are fabricated with NPT fittings required by end users when attaching nozzles, pour spouts and the like. The market for steel drums has been readily effected by the manufacture of plastic drum assemblies from thermoplastic sheets formed into a drum shell and enclosed by plastic drum heads welded to the drum sheet since the drum heads are blow molded with buttress threads vice NPT threads. NPT threads may not be reliably blow molded to exact dimensions.

In U.S. Pat. Nos. 4,155,794 and 4,252,585, there are disclosed processes for manufacturing containers from extruded sheets of thermoplastic material wherein the extruded plastic sheet is cut into a sheet of predetermined length and formed into a hollow cylinder with the cut ends of the sheet defining the cylindrical ends and with a longitudinal slit extending axially of the cylinder and defined by the sheet side edges whereupon a bonding material is applied to the slit and processed in a single operation to form a continuous impervious seal thereby to form a drum shell. Thereafter, top and bottom closure members or drum heads are secured to the ends of the thus formed drum shell.

In U.S. Pat. No. 4,201,306 to Dubois et al, there is disclosed a process for forming a plastic drum having a lower bottom closure and a top closure welded to the drum shell using a thermoplastic bonding system as described in U.S. Pat. Nos. 3,620,875 and 3,620,876. The top closure of the top drum head is formed with threaded openings for receiving respective threaded closure caps or plugs. Damage to the threads of the threaded openings during repeated use eventually renders the threaded opening inoperable and thus the plastic drum unusable notwithstanding the fundamental integrity of the drum shell, the lower bottom closure and the top closure except for the damaged threaded openings.

OBJECTS OF THE INVENTION

An object of the present invention is to provide a novel process for providing NPT fittings to a drum head of a plastic drum container assembly.

A further object of the present invention is to provide a process for removing and installing NPT fittings to a drum head of a plastic drum container assembly.

Another object of the present invention is to provide a novel fitting and opening configuration for a drum head of a plastic drum container assembly.

Still another object of the present invention is to provide a process for readily removing damaged NPT fittings from a drum head of a plastic drum container assembly.

Yet another object of the present invention is to provide a novel process for readily installing a fitting in a drum head of a plastic drum container assembly.

SUMMARY OF THE INVENTION

These and other objects of the present invention are achieved by a novel reusable plastic drum container assembly and a process for installing a fitting-receiving member in an opening provided in a drum head wherein the opening is formed by a cylindrically-shaped neck member having an outer sloping surface including a circularly-shaped indentation portion extending perpendicularly from top surface of the drum head and wherein the fitting-receiving member in cross-section is of an inverted U-shape having an inner cylindrically-shaped portion, a circularly-shaped base portion, and an outer cylindrically-shaped leg portion defining a channel and is disposed over the neck member of the drum head with an electromagnetic bonding material fused between the outer surfaces of the neck member and the interior surfaces of the fitting-receiving member.

BRIEF DESCRIPTION OF THE DRAWINGS

A better understanding of the present invention as well as other objects and advantages thereof will become apparent upon consideration of the detailed disclosed thereof, especially when taken with the accompanying drawings, in which.

DETAILED DESCRIPTION OF THE INVENTION

Figure 1:
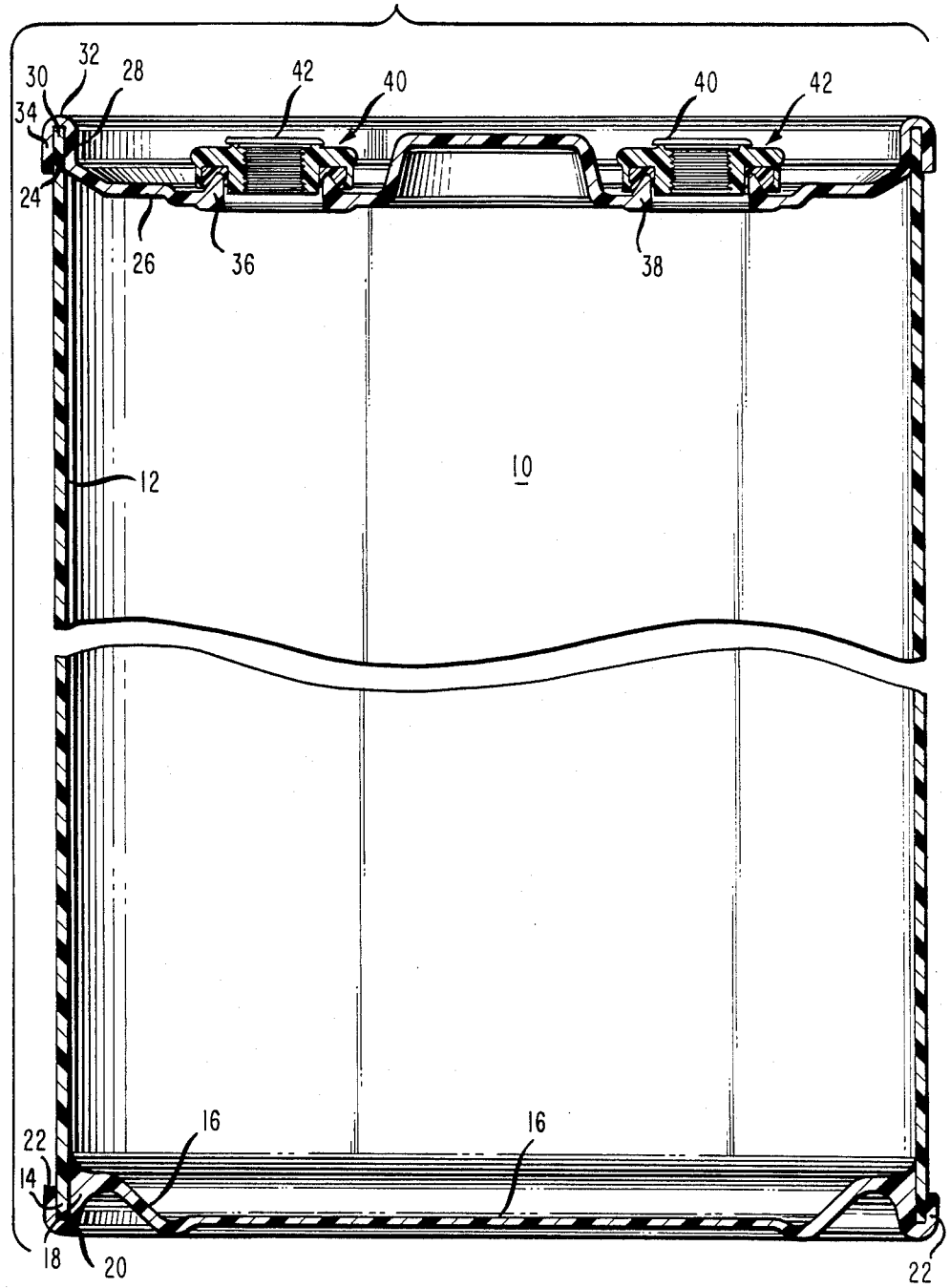
FIG. 1 is a cross-sectional elevational view of a plastic drum container assembly of the present invention.

Referring now to FIG. 1, there is illustrated a plastic drum container assembly of the present invention, generally indicated as 10, and comprised of a drum shell 12 forming the side wall thereof. The drum shell 12 is enclosed at a bottom end 14 by a bottom closure member 16 including a peripheral circumferentially-extending apron 18 adapted to engage with the internal surface of the bottom end 14 of the drum shell 12. The apron 18 terminates in a lateral radially-extending flange portion 20 merging into an upwardly extending skirt portion 22 extending around and outwardly spaced from an outer surface of the bottom end 14 of the drum shell 12. The skirt portion 22 engages with an outer face of the bottom end 14 of the drum shell 12 for retaining welding material between an inner face of the apron flange portion 20 and skirt portion 22.

The drum shell 12 is enclosed at an upper end 24 by a top closure 26 to form a tight head. The top closure member 26 is formed with a peripheral circumferentially-extending skirt portion 28 engaging an inner surface 30 of the upper end 24 of the drum shell 12. The skirt portion 28 merges into a laterally and outwardly-extending radial flange portion 32 from which extends a downwardly depending skirt portion 34.

The top closure member 26 is formed with at least one filling and emptying neck member 36, and optionally a venting-neck member 38 for mounting a fitting or cap-receiving member, generally indicated as 40, for receiving a fitting or cap member 42. Since the filling and emptying neck member 36 is subjected to greater use and thus potential damage, the installation of a fitting or cap-receiving member 40 to the filling neck member 36 will hereinafter be more fully described.

Figure 2:
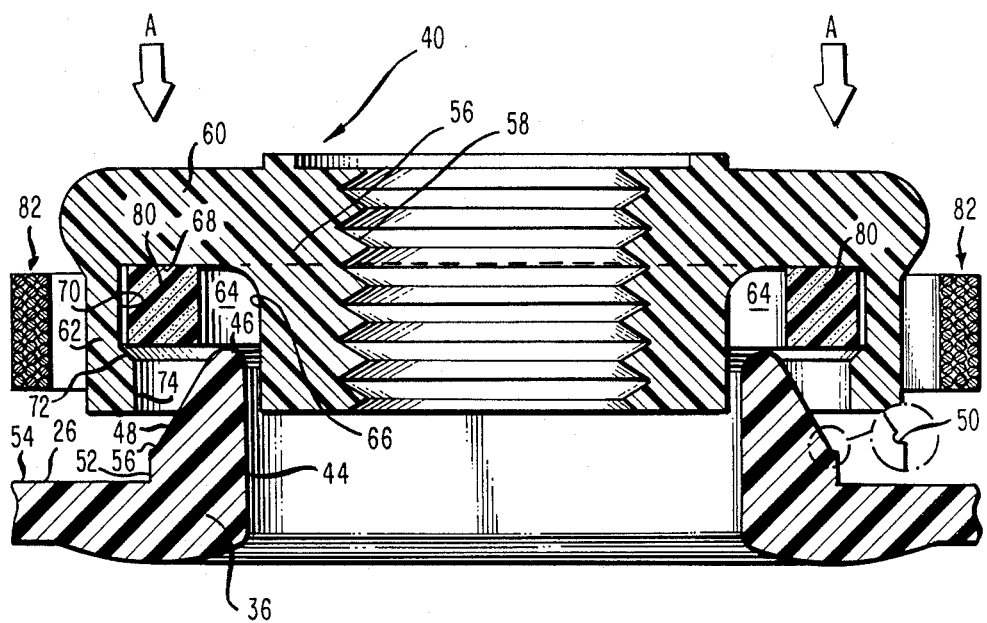
FIG. 2 is an enlarged partial cross-sectional view of the pre-positioning of a fitting-receiving member to a cylindrically-shaped neck member including opening for the top closure of the plastic drum container assembly of the present invention.

Referring to FIG. 2, the filling neck member 36 opening of the top closure member 26 is integrally formed during the molding thereof and is generally a cylindrically-shaped portion extending upwardly from the top closure member 26 in a plane substantially perpendicular to the plane of the top end closure member 26. The filling neck member 36 is formed with an inner cylindrically-shaped surface 44, a radially-shaped upper surface 46, a downwardly and outwardly sloping outer surface 48 including a circularly-shaped indentation portion 50 and a lower outer cylindrically-shaped surface 52 intersecting a top surface 54 or the top closure member 26.

The fitting-receiving member 40 is generally disc-shaped and comprised of a cylindrically-shaped main body portion 56 having an internal threaded surface 58 axially formed therein and a radially-extending upper flange portion 60 from which extends downwardly a cylindrically-shaped skirt portion 62 forming a U-shaped chamber 64 for receiving the neck member 36 of the top closure member 26. The U-shaped chamber 64 is defined by an outer cylindrically-shaped surface 66 of the body portion 56 of the fitting-receiving member 40 extending curvilinearly towards a radially extending inner surface 68 of the flange portion 60. The skirt portion 62 of the fitting-receiving member 40 is formed with an upper inner cylindrically-shaped surface 70 terminating at an inwardly projecting radial portion 72 to a cylindrically-shaped inner surface portion 74 of a diameter slightly smaller than the diameter of the inner surface 70 and larger than the diameter of the surface 52 of the fitting neck member 36.

In the process of manufacture of a plastic drum container assembly of the present invention, there is positioned within the U-shaped chamber 64 of the fitting-receiving member 40 a pre-molded ring-shaped member 80 formed of thermoplastic material containing an electromagnetic material, such as iron filings. The neck member 36 is shaped to be disposed within the chamber 64 of the fitting-receiving member 40 and fixed therein by the thermoplastic material captured within the chamber 64 as well as within the indentation portion 50 of the neck member 36 and to the outer surfaces of the neck member 36 and the interior surfaces of the fitting-receiving member 40. Such configuration of the chamber 64 ensures proper positioning of the precursor weld material as well as the subsequent processing protocol to ensure proper positioning in welded configuration of the fitting-receiving member 40 with respect to the neck member 36, as more fully hereafter described.

Figure 3:
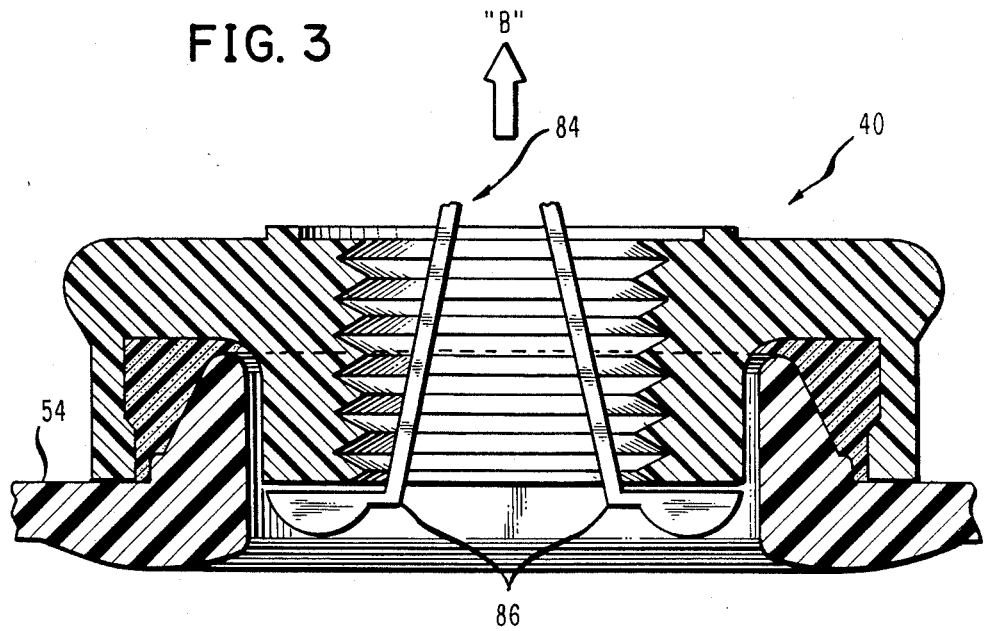
FIG. 3 is an enlarged partial cross-sectional view of the resulting welded fitting-receiving member neck member configuration for the plastic drum container assembly of the present invention.

The fitting-receiving member 40 including the ring-shaped weld material 80 is positioned in coaxial alignment above the neck member 36, as illustrated in FIG. 2. A water-cooled circularly-shaped coil, generally indicated as 82, is then positioned about the fitting-receiving member 40 in a plane perpendicular to the longitudinal axis thereof and substantially in a plane of the ring-shaped weld material 80. A high frequency alternating current from a source (not shown) is applied to the coil 82 to establish an electromagnetic field through the thermoplastic electromagnetic material 80 to thereby raise the temperature of the thermoplastic material to its fusion temperature as a result of heat losses (eddy current and hysteresis) from the thermoplastic electromagnetic material. A force (as indicated by the arrows "A") is circumferentially applied downwardly on the fitting-receiving member 40 about a cylindrical plane in coaxial alignment with the longitudinal axis of the fitting-receiving member 40 to force the fitting-receiving member 40 including the molten electromagnetic material 80 onto the neck member 36 of the top closure member 26, as illustrated in FIG. 3.

In assembled configuration, the skirt member 62 of the fitting-receiving member 40 is generally in contact with the upper surface 54 of the top closure member 26 (is "bottomed-out" during positioning) and the molten thermoplastic material distributed in the area between the inner surfaces 66, 68, 70 and 72 of the body portion 56, the radial portion 60 and skirt portion 62, respectively of the fitting-receiving member 40 and about the surfaces 44, 46, 48, 52 and 54 of the neck member 36 of the closure member 26. In such relationship, the spacing in the assembled configuration between the sheet portion 72 of the fitting-receiving member 40 and the top surface 54 of the top closure member 26 restricts flow of the molten thermoplastic material therebetween to achieve satisfactory capture of the member 40 to the neck member 36, as well as flow over and through the radial channel formed between the inner surface 44 of the neck member 36 and the surface 66 of the fitting-receiving member 40.

Initial assembly of the fitting-receiving member 40 to the top closure member 26 may be effected either before or after assembly of the top closure member 26 to the drum shell 12. In a reconditioning format of a plastic drum container 10 involves the removal of a damaged fitting-receiving member 40. To remove a damaged fitting-receiving member 40. To remove a damaged fitting-receiving member 40, a like induction coil assembly 82 is positioned about the damaged fitting-receiving member 40 (at about a like position as in assembly), and a retraction assembly, generally indicated as 84, including hook members 86, referring to FIG. 3 is inserted through the threaded orifice 58 and deployed for engagement with the body portion 56 of the fitting-receiving member 42. Thereupon, a high frequency alternating current is applied to the coil assembly 82 to raise the temperature of the thermoplastic electromagnetic material to its fusion temperature whereupon the retraction assembly 84 is caused to be withdrawn (as indicated by arrow "B") from the top closure member 26 of the plastic drum container 10 together with the damaged fitting-receiving member 40.

Any extraneous electromagnetic material may be removed, or alternately left since any extraneous electromagnetic material can be reactivated or remelted together with new thermoplastic electromagnetic material 80 upon installation of a new fitting-receiving member 40 on the top closure member 26 of a reconditioned plastic drum container 10. It will be understood by one skilled in the art, that any extraneous electromagnetic material which would interfere with the refitting protocol, i.e. would effect proper positioning of a new fitting, would be removed by appropriate techniques. In accordance with the present invention, the useful life of a plastic drum container assembly may be extended by a factor of from 3 to 4 times, or alternately, until the plastic drum container assembly is no longer useful for other reasons.

While the invention has been described in connection with several exemplary embodiments thereof, it will be understood that many modifications will be apparent to those of ordinary skill in the art: and that this application is intended to cover any adaptations or variations thereof. Therefore, it is manifestly intended that this invention be only limited by the claims and the equivalents thereof.

What is claimed:

1. In a process for assembling a plastic drum container assembly including a drum shell and top and bottom closure members affixed to said drum shell, the steps comprising:
   (a) positioning a fitting-receiving member and a thermoplastic electromagnetic material about a neck member formed on said top closure member, said neck member comprised of a cylindrically-shaped portion extending upwardly from said top closure member and formed with an indentation portion in a surface thereof, said fitting-receiving member formed with a circularly-shaped channel for positioning said neck member therein, said thermoplastic electromagnetic material being disposed within said channel of said fitting-receiving member;
   (b) establishing a electromagnetic field about said thermoplastic electromagnetic material for a time sufficient to melt said thermoplastic electromagnetic material; and
   (c) placing a downward force on said fitting-receiving member to cause said neck member of said top closure member to extend into said channel of said fitting-receiving member including molten thermoplastic electromagnetic material thereby to mount said fitting-receiving member to said top closure member.

2. The process for assembling a plastic drum container assembly as defined in claim 1 wherein said indentation portion is circularly-shaped and formed in an outer surface portion of said neck member.

3. The process for assembling a plastic drum container assembly as defined in claim 2 wherein said outer surface portion is an outwardly extending frusto-conically-shaped surface to uniformly force said molten thermoplastic electromagnetic material within an area defined between said fitting-receiving member and said neck member during step (c).

4. The process for assembling a plastic drum container assembly as defined in claim 2 wherein said thermoplastic electromagnetic material is ring-shaped and is positioned within said channel of said fitting-receiving member prior to positioning of said fitting-receiving member about said neck member.

5. The process of assembling a plastic drum container assembly as defined in claim 1 wherein said fitting-receiving member is formed to contact a top surface of said top closure during step (c).

6. The process for assembling a plastic drum container assembly as defined in claim 1 wherein said downward force of step (c) is directed axially towards said neck member 7. The process for assembling a plastic drum container assembly as defined in claim 1 wherein said fitting-receiving member is formed with NPT threads.

8. A process for refurbishing a plastic drum container assembly including a drum shell and top and bottom closure members affixed to said drum shell and wherein said top closure member includes a fitting-receiving member including a fitting orifice affixed to a neck member formed on said top closure member by a thermoplastic electromagnetic material, the steps comprising:
   (a) inserting a retraction member into said fitting orifice of said fitting-receiving member to engage said fitting-receiving member;
   (b) establishing an electromagnetic field about said fitting-receiving member affixed to said neck member for a time sufficient to melt said thermoplastic electromagnetic material;
   (c) withdrawing said retraction member including said fitting-receiving member from said neck member of said top closure member;
   (d) refurbishing said drum shell;
   (e) positioning a new fitting-receiving member including a thermoplastic electromagnetic material about said neck member of said top closure member;
   (f) establishing an electromagnetic field about said fitting-receiving member affixed to said neck member for a time sufficient to melt said thermoplastic electromagnetic material; and
   (g) placing a downward force on said fitting-receiving member to cause said neck member of said top closure member to extend into said channel of said fitting-receiving member including molten thermoplastic electromagnetic material thereby to mount said fitting-receiving member to said top closure member.

9. The process for refurbishing a plastic drum container assembly as defined in claim 8 wherein said fitting-receiving member is formed with an indentation about an outer surface thereof.

10. The process for refurbishing a plastic drum container assembly as defined in claim 9 wherein withdrawal of said retraction member is upward and axially from said neck member of said top closure.

11. The process for refurbishing a plastic drum container assembly as defined in claims 9 or 10 wherein said thermoplastic electromagnetic material is ring-shaped and is positioned within said channel of said fitting-receiving member.

12. The process for refurbishing a plastic drum container assembly as defined in claims 9 or 10 wherein said fitting-receiving member is formed to contact a top surface of said top closure during step (g).

13. The process for refurbishing a plastic drum container assembly as defined in claims 9 or 10 wherein said downward force of step (g) is directed axially towards said neck member.

14. The process for refurbishing a plastic drum as defined in claims 9 or 10 wherein said fitting-receiving member is formed with NPT threads.

* * * * *